United States Patent
Silverstein et al.

(10) Patent No.: US 12,061,890 B2
(45) Date of Patent: Aug. 13, 2024

(54) SUPPORT TRACKING VIA EMBEDDED NFTS

(71) Applicant: International Business Machines Corporation, Armonk, NY (US)

(72) Inventors: Zachary A. Silverstein, Austin, TX (US); Melanie Dauber, New York, NY (US); Logan Bailey, Sandy Springs, GA (US); Jacob Ryan Jepperson, Rochester, MN (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 18/083,529

(22) Filed: Dec. 18, 2022

(65) Prior Publication Data
US 2024/0201969 A1    Jun. 20, 2024

(51) Int. Cl.
G06F 8/61        (2018.01)
H04L 9/30        (2006.01)
H04L 9/32        (2006.01)

(52) U.S. Cl.
CPC .......... *G06F 8/61* (2013.01); *H04L 9/30* (2013.01); *H04L 9/3213* (2013.01); *H04L 2209/60* (2013.01)

(58) Field of Classification Search
CPC ........................................................ G06F 8/61
See application file for complete search history.

(56) References Cited

U.S. PATENT DOCUMENTS

| | | |
|---|---|---|
| 10,241,780 B1 | 3/2019 | Gailey, Jr. |
| 10,521,333 B2 | 12/2019 | Aasheim et al. |
| 11,295,318 B2 | 4/2022 | Andon et al. |
| 11,443,838 B1 * | 9/2022 | Cordonnier ............ G16H 10/60 |
| 11,461,437 B1 * | 10/2022 | LaMontagne ........... G06F 21/64 |
| 2003/0110248 A1 | 6/2003 | Ritche |
| 2005/0060217 A1 | 3/2005 | Douglas et al. |
| 2015/0193284 A1 * | 7/2015 | Hamzata ............. G06F 9/45533 719/313 |
| 2019/0279204 A1 | 9/2019 | Norton et al. |
| 2020/0202334 A1 | 6/2020 | Graf et al. |

(Continued)

FOREIGN PATENT DOCUMENTS

| | | |
|---|---|---|
| CN | 107589727 A | 1/2018 |
| CN | 110674631 A | 1/2020 |
| CN | 114556396 A | 5/2022 |

OTHER PUBLICATIONS

Anonymous, NFTs: The Future of Software Licensing & Digital Ownership, Published in Spendee: When your money talks, Mar. 7, 2022.

*Primary Examiner* — Jae U Jeon

(57) ABSTRACT

An example operation may include one or more of receiving a request to install a software system via a host platform, where the software system comprises a plurality of software programs of a plurality of providers, respectively, generating a non-fungible token (NFT) for a software program from among the plurality of software programs based on a private key, embedding the NFT with the software program within the software system and storing provider data of the software program mapped to the NFT via a blockchain ledger, and installing the software system via the host platform with the NFT embedded therein.

20 Claims, 11 Drawing Sheets

(56) References Cited

U.S. PATENT DOCUMENTS

| | | | |
|---|---|---|---|
| 2020/0213121 A1 | 7/2020 | Hioki | |
| 2023/0259942 A1* | 8/2023 | Raffay | G06Q 20/065 705/64 |
| 2024/0062620 A1* | 2/2024 | Hufnagl-Abraham | G07F 17/3239 |

* cited by examiner

370

SUPPORT TRACKING VIA EMBEDDED NFTS

BACKGROUND

In a cloud environment, customer solutions can be quite complex including software solutions from multiple providers. In such a complex environment, it can be difficult to identify which software (and which corresponding provider) are responsible for supporting the customer when issues and errors occur within the customer's solution. The problem is further exacerbated when a ticket is submitted by the customer to the cloud provider. In this case, the cloud provider may investigate the issue within the ticket for hours or even days only to find out that a different provider inside the customer's solution is responsible for the issue.

SUMMARY

One example embodiment provides an apparatus that may include a storage configured to store a blockchain ledger, and a processor that may receive a request to install a software system via a host platform, where the software system comprises a plurality of software programs of a plurality of providers, respectively, generate a non-fungible token (NFT) for a software program from among the plurality of software programs based on a private key, embed the NFT with the software program within the software system and store provider data of the software program mapped to the NFT via the blockchain ledger, and install the software system via the host platform with the NFT embedded therein.

Another example embodiment provides a method that may include one or more of receiving a request to install a software system via a host platform, where the software system comprises a plurality of software programs of a plurality of providers, respectively, generating a non-fungible token (NFT) for a software program from among the plurality of software programs based on a private key, embedding the NFT with the software program within the software system and storing provider data of the software program mapped to the NFT via a blockchain ledger, and installing the software system via the host platform with the NFT embedded therein.

A further example embodiment provides a computer-readable medium comprising instructions, that when read by a processor, cause the processor to perform one or more of receiving a request to install a software system via a host platform, where the software system comprises a plurality of software programs of a plurality of providers, respectively, generating a non-fungible token (NFT) for a software program from among the plurality of software programs based on a private key, embedding the NFT with the software program within the software system and storing provider data of the software program mapped to the NFT via a blockchain ledger, and installing the software system via the host platform with the NFT embedded therein.

DETAILED DESCRIPTION

It is to be understood that although this disclosure includes a detailed description of cloud computing, implementation of the teachings recited herein is not limited to a cloud computing environment. Rather, embodiments of the present application are capable of being implemented in conjunction with any other type of computing environment now known or later developed.

The example embodiments are directed to a system and method that leverages unique identifiers to allow consumers to better determine which layers of their technology stack are causing issues with their deployment and the contractual obligations in place for each portion of the solution to determine the vendors and levels of support available. For example, the system may embed a unique non-fungible token (NFT) into one or more programs/layers of a software system during an install of the software system. An example of the software system is a file system, but embodiments are not limited thereto and the software system may include any software project or system with multiple programs therein. The NFT may be based on a private key that has a corresponding key pair (public key) that is stored on a blockchain ledger along with details of the provider of the software program.

When an issue arises with an application or other program supported by the software system, the host system can examine log data, records of other software programs, etc., and identify which NFT is responsible for the issue. Next, the host system can map the NFT to its corresponding provider based on the private key embedded within the NFT. Here, the corresponding public key can be identified and the provider data associated with the public key can also be identified and used to provide notifications and issue service calls/tickets for support of the issue. An example of a host system is a cloud platform, but embodiments are not limited thereto. Also, the host system may be based on a containerization technology in which software systems may be individually located within each container thereby creating an isolated and dedicated virtual computing environment for the software included in the container.

Figure 1:
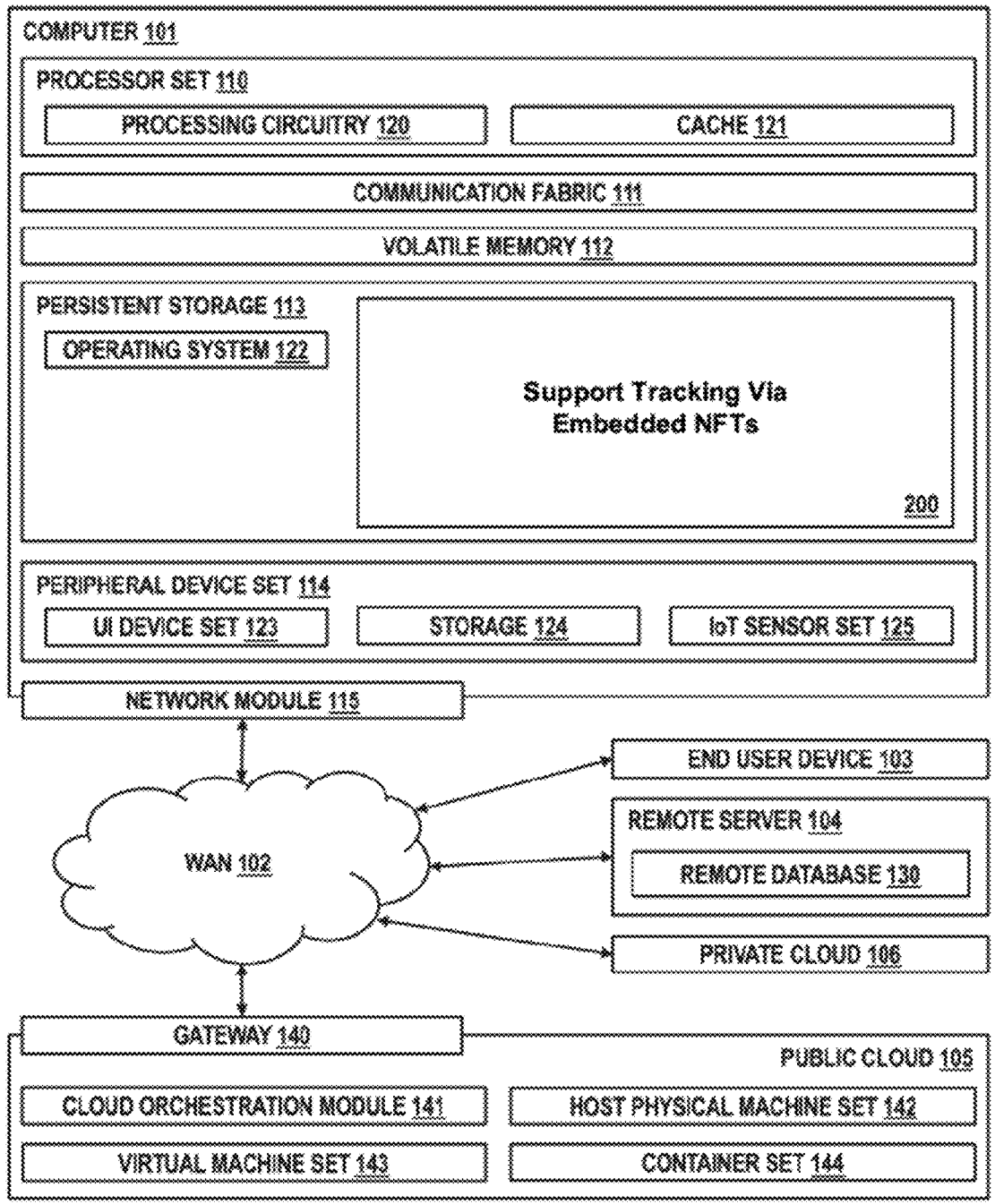
FIG. 1 is a diagram illustrating a computing environment according to example embodiments.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code of the instant solution, such as support tracking via embedded NFTs 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the instant solution. In computing environment 100, at least some of the instructions for performing the instant solution may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the instant solution.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the instant solution can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2:
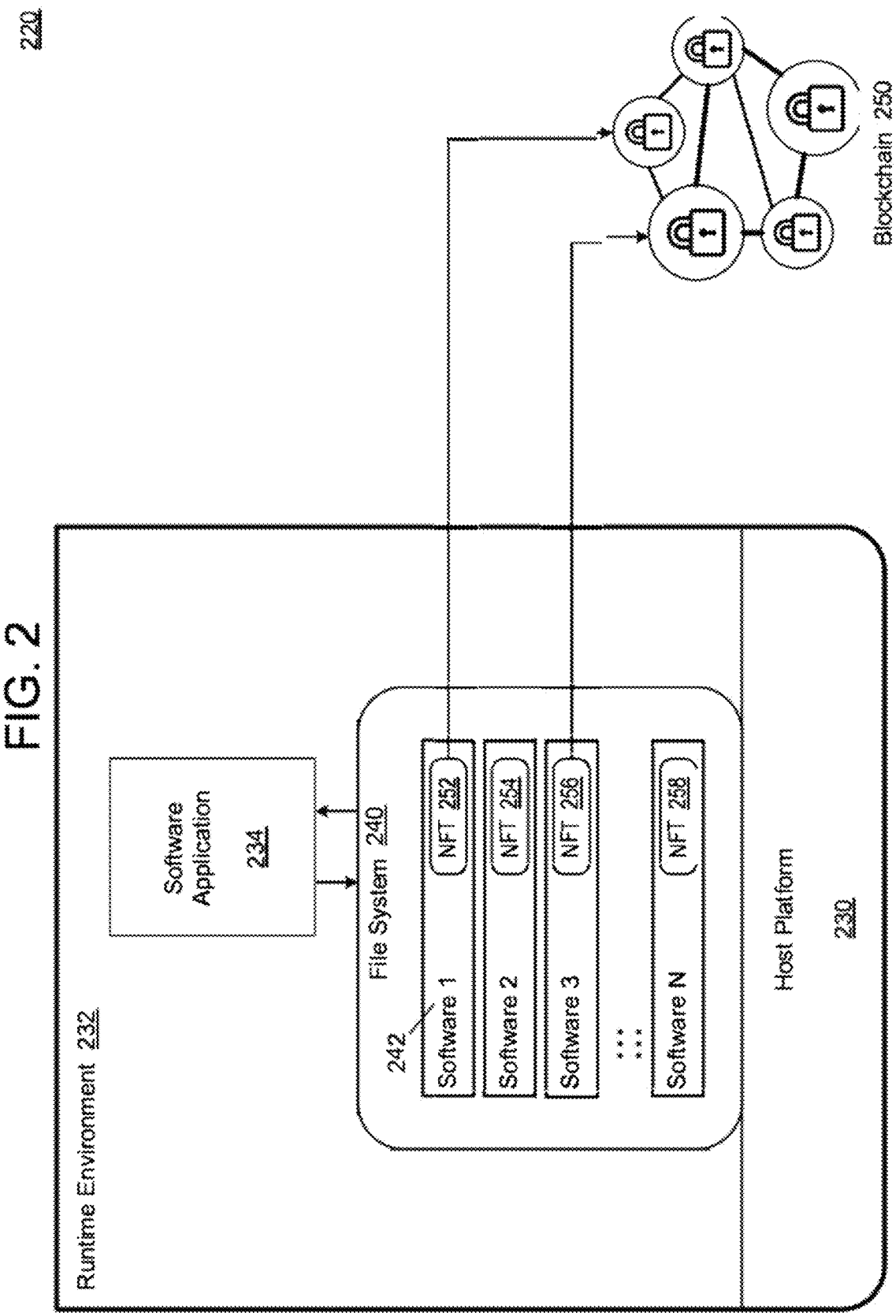
FIG. 2 is a diagram illustrating a system for support tracking via embedded NFTs, according to example embodiments.

FIG. 2 illustrates a computing system 220 that can embed NFTs associated with providers within different software programs of a file system and use this data to identify a provider that is responsible for supporting an issue within the file system when the issue occurs using the NFTs according to example embodiments. While a file system is used in the example of FIG. 2, it should be appreciated that any software program or system may be used. FIG. 2 illustrates an example of a file system 240 that supports a software application 234 within a runtime environment 232 generated by a host platform 230. Here, the host platform 230 may be a cloud platform, a web server, a database, an on-premises server, or the like.

The software application 234 and the file system 240 may be embodied within a container together (not shown) within the runtime environment 232 of the host platform 230. Here, the container can provide an isolated execution environment for the software application 234 using programs, files, etc., within the file system 240. As one example, the file system 240 may be included within a CLOUD PAK®, or other file systems or containerization systems. The file system 240 may include programs, software applications, operating systems, files of data, machine learning models, artificial intelligence engines, pre-integrated data, and the like. In the example of FIG. 2, the file system 240 includes N software programs including software program 1, software program 2, software program 3, . . . software program N.

According to various embodiments, a consumer may request that a container for executing software application 234 be installed in the runtime environment 232 of the host platform 230 and include the file system 240. During the install process, the host platform 230 may identify software programs that are installed within the file system 240 and embed unique NFTs therein. For example, the four software programs shown in the file system 240 of FIG. 2 may be embedded within four unique NFTs 252, 254, 256, and 258, respectively. Each NFT is unique because it uniquely identifies a particular software program that is installed within the consumer's file system 240 with respect to all other file systems and consumers on the host platform 230.

Figure 4A:
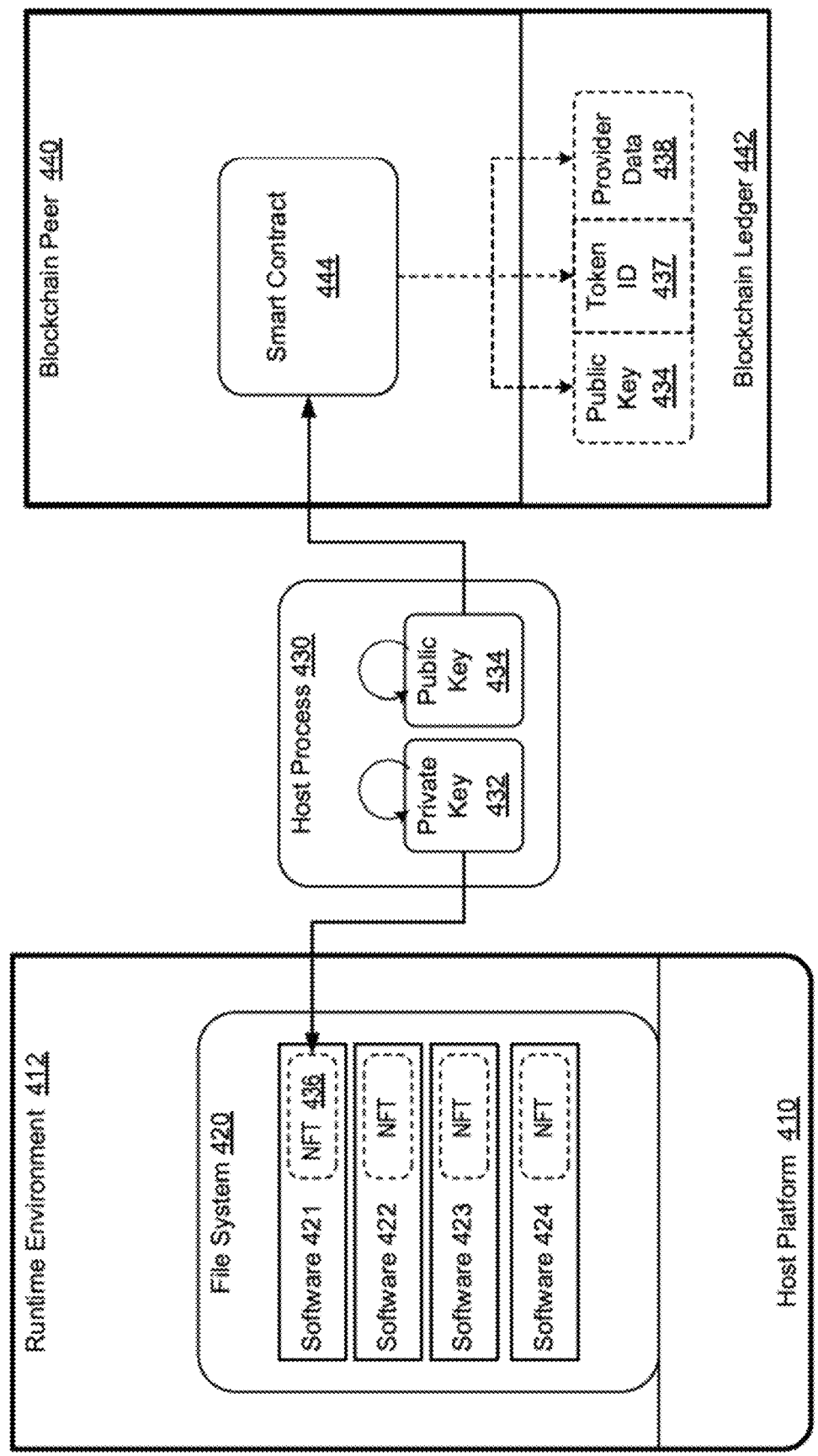
FIGS. 4A-4C are diagrams illustrating a process of identifying a provider that is responsible for a software issue with a software system according to example embodiments.
Figure 4B:
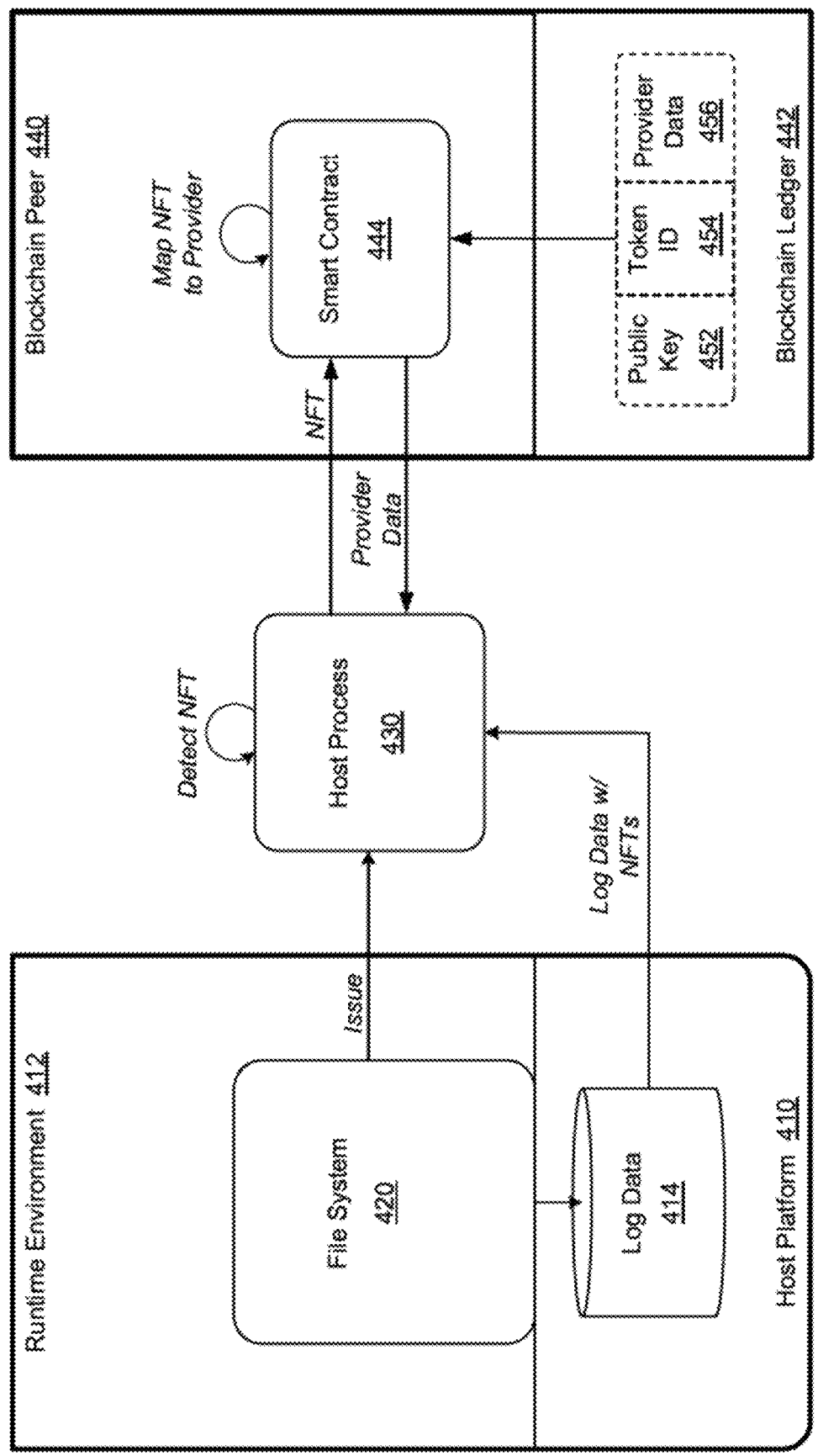
Figure 4C:
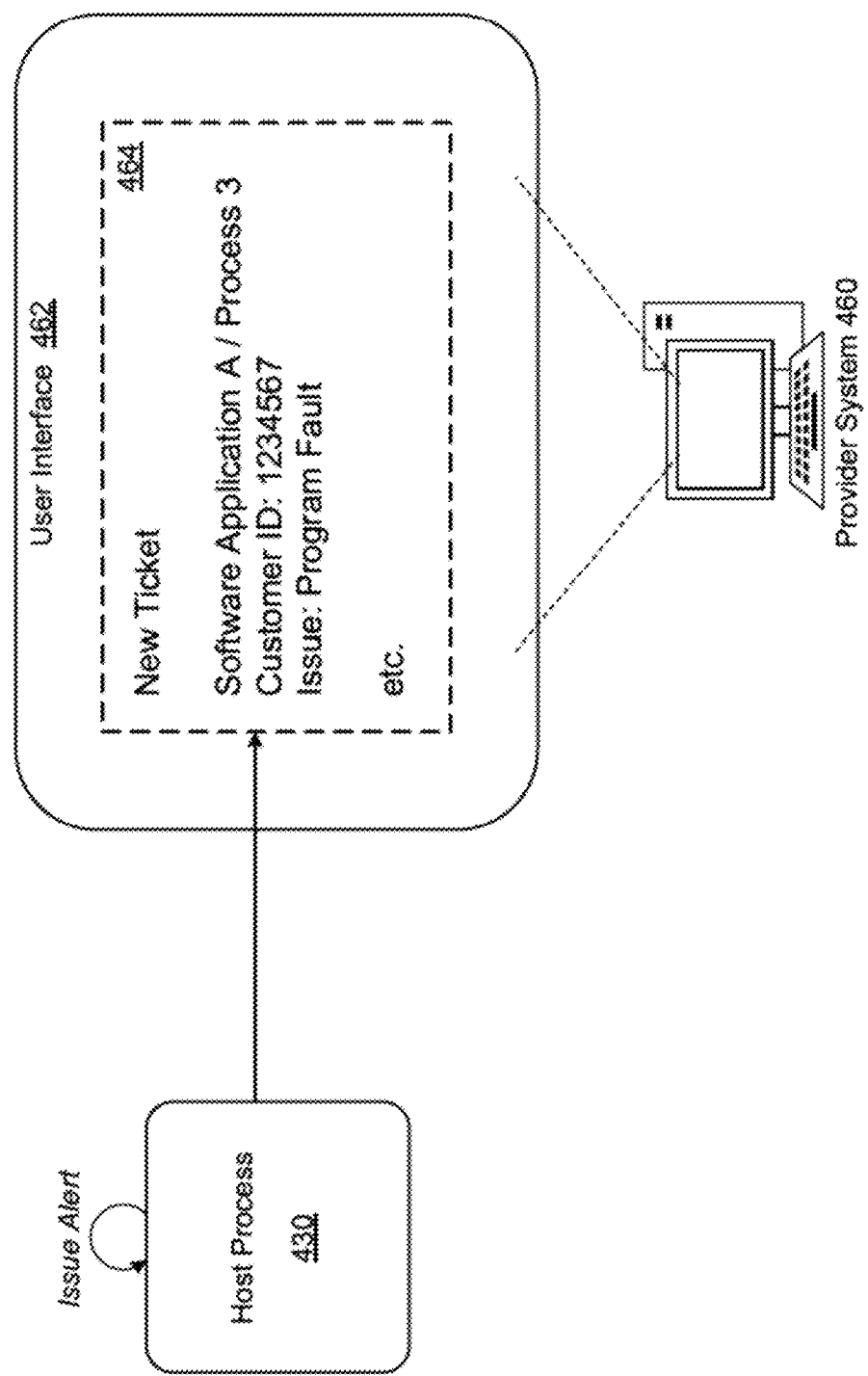

According to various embodiments, and as further described in the examples of FIGS. 4A-4C, the NFT may be generated by the host platform 230 based on a symmetric key pair that includes a unique private key and a unique public key. The private key may be used to generate the NFT and the public key may be stored on a blockchain ledger 250 along with vendor details and a link to the NFT (e.g., a unique ID of the NFT that is embedded in the file system 240, etc.) In this manner, the NFT embedded within a software program stored within the file system 240 may be linked to provider information of the software stored on a blockchain ledger 250. For example, log data may be captured that includes identifiers of the NFTs associated with each of the programs within the file system. Using this data, the host platform can identify an issue within the log data, and the NFT that is labeled with the issue. Next, the host can map the NFT to the NFT identifier paired with the public key stored on the blockchain ledger 250.

For example, a software program 242 may be provided by a vendor A. In this example, the host platform 230 may generate a key pair and a token (i.e., an NFT) and generate a mapping between a token identifier of the NFT stored in the software program 242 and a private key of the key pair generated by the host platform 230. Furthermore, a corresponding public key of the key pair may be combined with provider details of vendor A and stored on the blockchain along with the token identifier of the NFT.

When an issue arises with the file system 240, a notification of the issue may be transmitted to the host platform 230. The host platform 230 may also pull data from other locations such as log data from the runtime environment 232 of the file system 240 to identify which software program is causing the issue with the file system 240. The log will include information about the activities/operations of the file system as well as NFTs of the programs involved in the activities. Thus, the host platform 230 can identify an issue within the log, and also identify the NFT assigned to the software program associated with the issue in the log. The host platform 230 can provide the NFT identifier to the blockchain 250 which can use this data to lookup the vendor information from the blockchain, validate the NFT based on the public key, and provide the vendor data which is stored with the NFT identifier on the blockchain to the consumer or the provider for fixing the problem.

The following is an example of a support issue that arises without the tracking system described herein. For example, a file system may run a plurality of software programs on a variety of infrastructure and hardware. A software application supported by the file system may experience an issue during runtime. A support technical specialist of the host system that provides the runtime environment may receive notification of the issue and then manually examine log files, documentation, any ticket submitted, etc. in an effort to identify the problem. At best, this process will take hours and the issue will be mapped to a provider. However, in many situations it is not that easy. Here, the support technical specialist may identify that a different software program offered by a different vendor is actually the cause of the issue. In this case, a new ticket must be created and forwarded to the vendor which starts the entire process over again. The customer will also likely be required to upload the log files and any necessary data to the vendor.

Now an example is provided in which the tracking system described herein is implemented and used to embed NFTs within the file system that is subject to the issue reported above. In this case, the instant the issue is reported, the host platform can identify the vendor that is responsible for the issue and contact them immediately in real-time. In particular, the issue can be matched to an entry (or entries) in a log file or other documentation. The entry may also include a unique NFT identifier of the software program responsible for the entry within the log. The host platform can query the blockchain based on the unique NFT identifier for the vendor information previously recorded on the blockchain and use this information to route the ticket to the vendor. That is, as soon as the root cause is determined and the troubled component identified, the distributed ledger and digital tokenized assets provide the details of the software component, the providing vendor and the terms of the contract to determine who is responsible for support. Accordingly, instead of wasting days/weeks trying to find the correct and proper support terms and vendor, the system immediately updates the ticket and notifies all involved parties. The ticket and all supporting documentation, including contract terms.

Figure 3A:
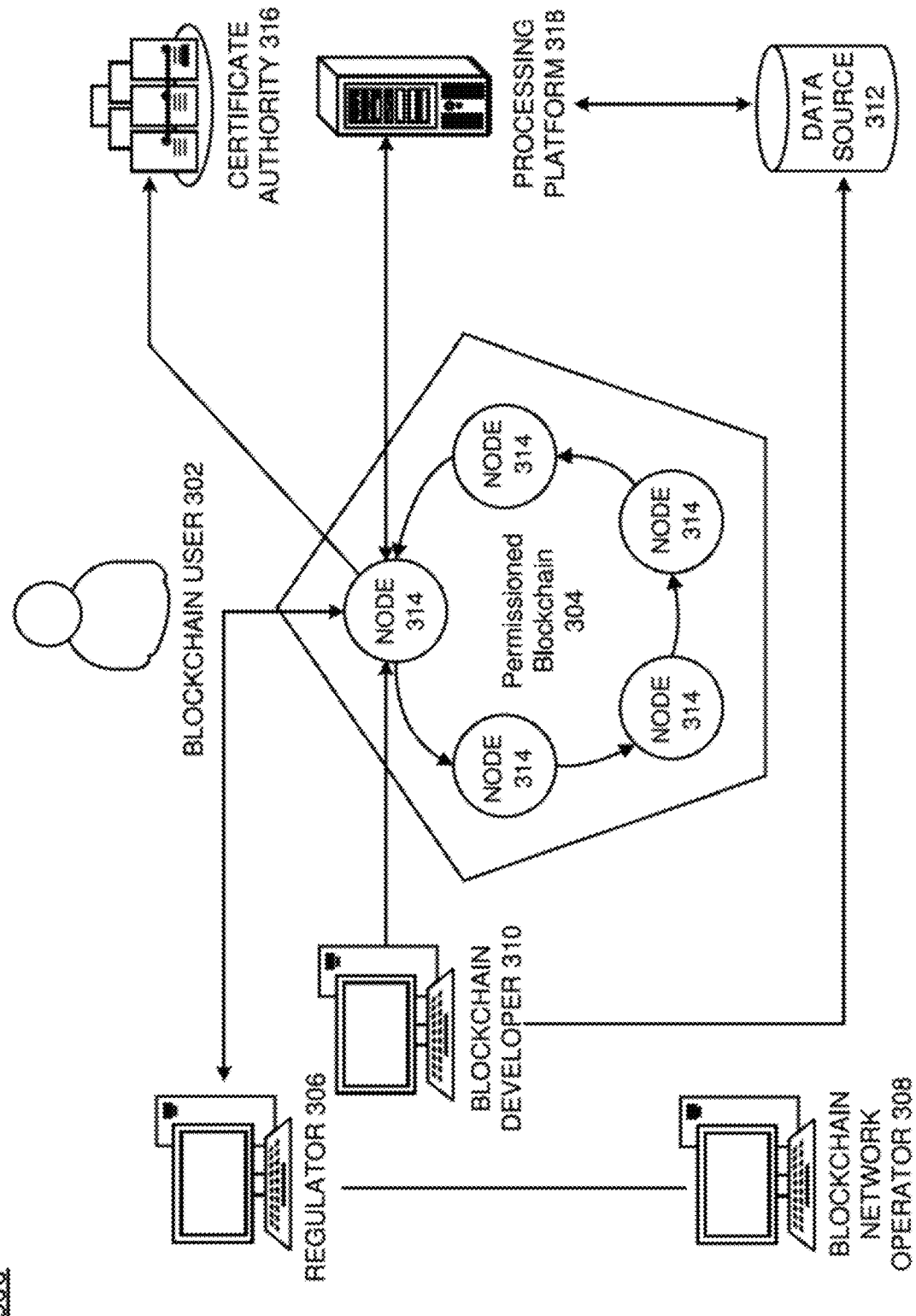
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
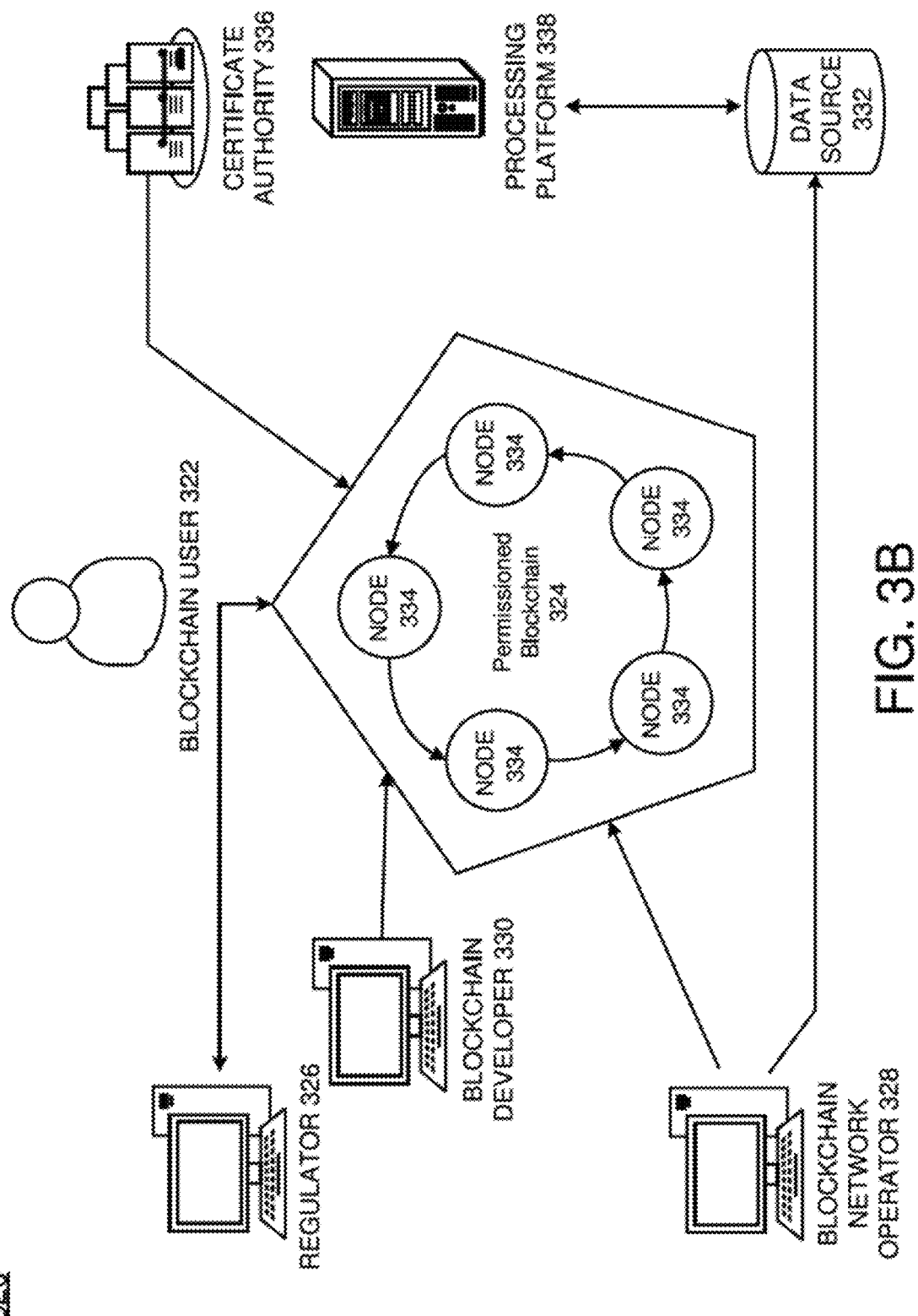
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger. Additionally, all parties have the choice of running a node on the system and employing the mining protocols to help verify transactions.

Figure 3C:
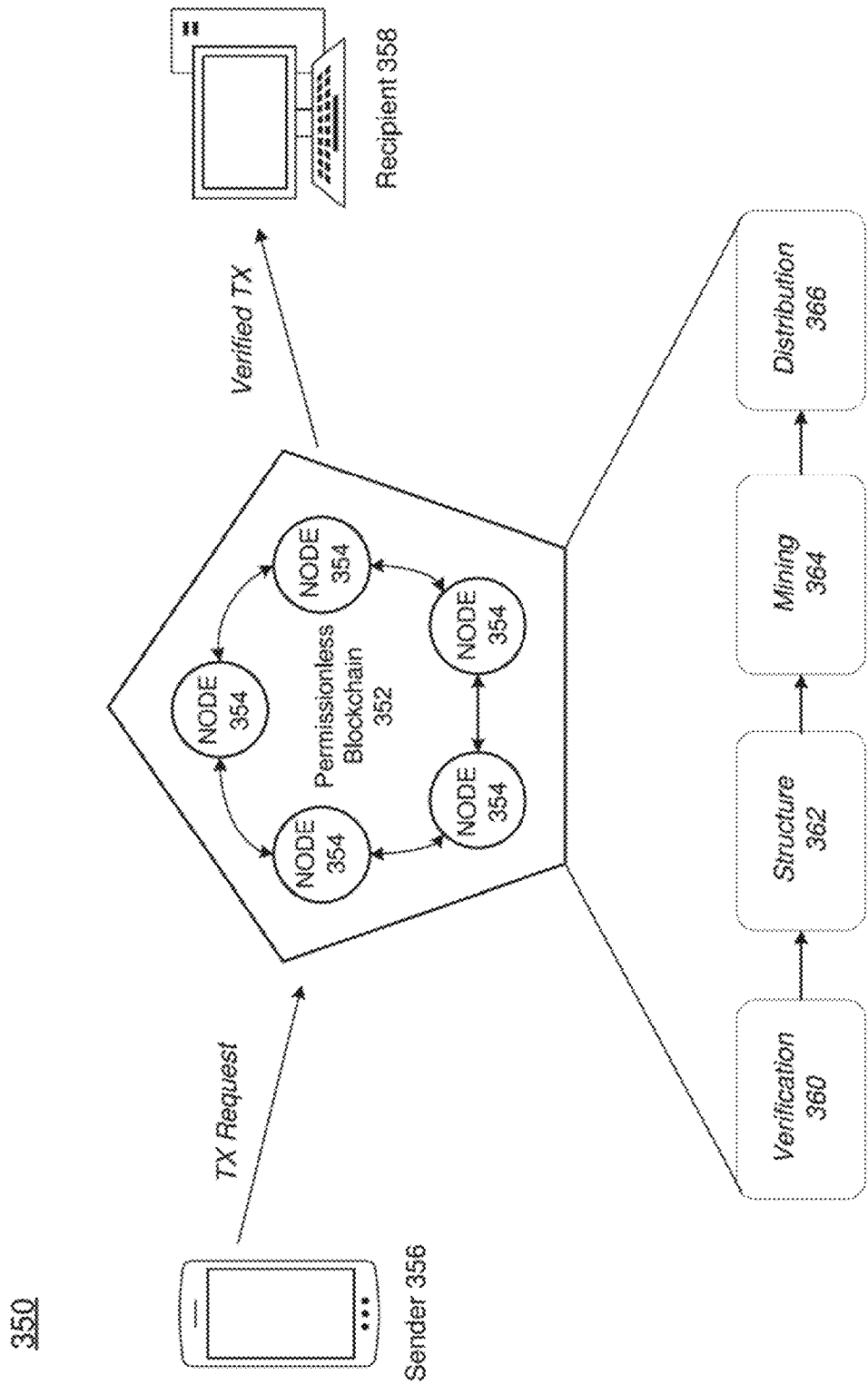
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
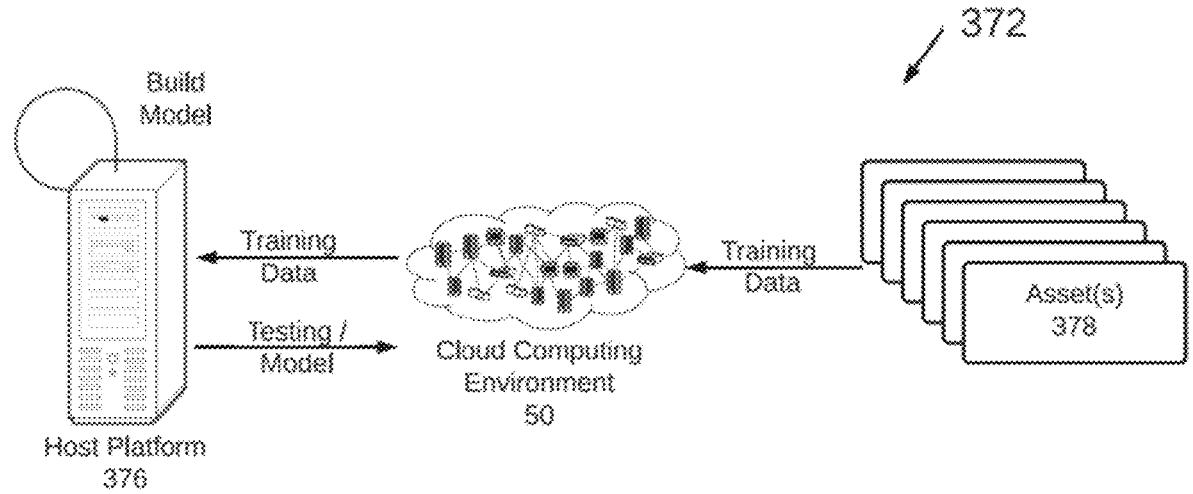
FIG. 3D is a diagram illustrating machine learning process via a cloud computing platform according to an example embodiment.
Figure 3D:
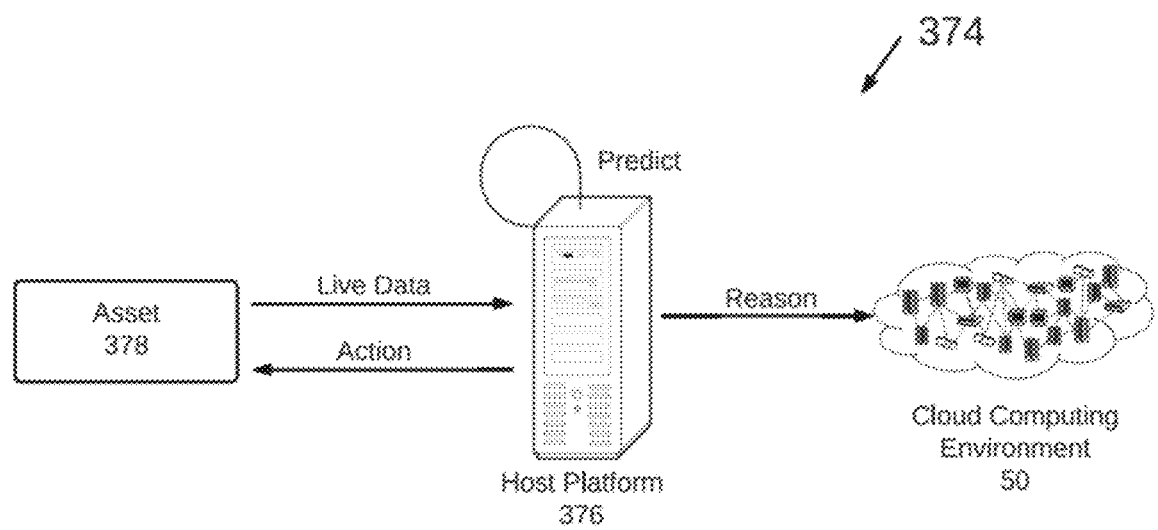
Figure 3E:
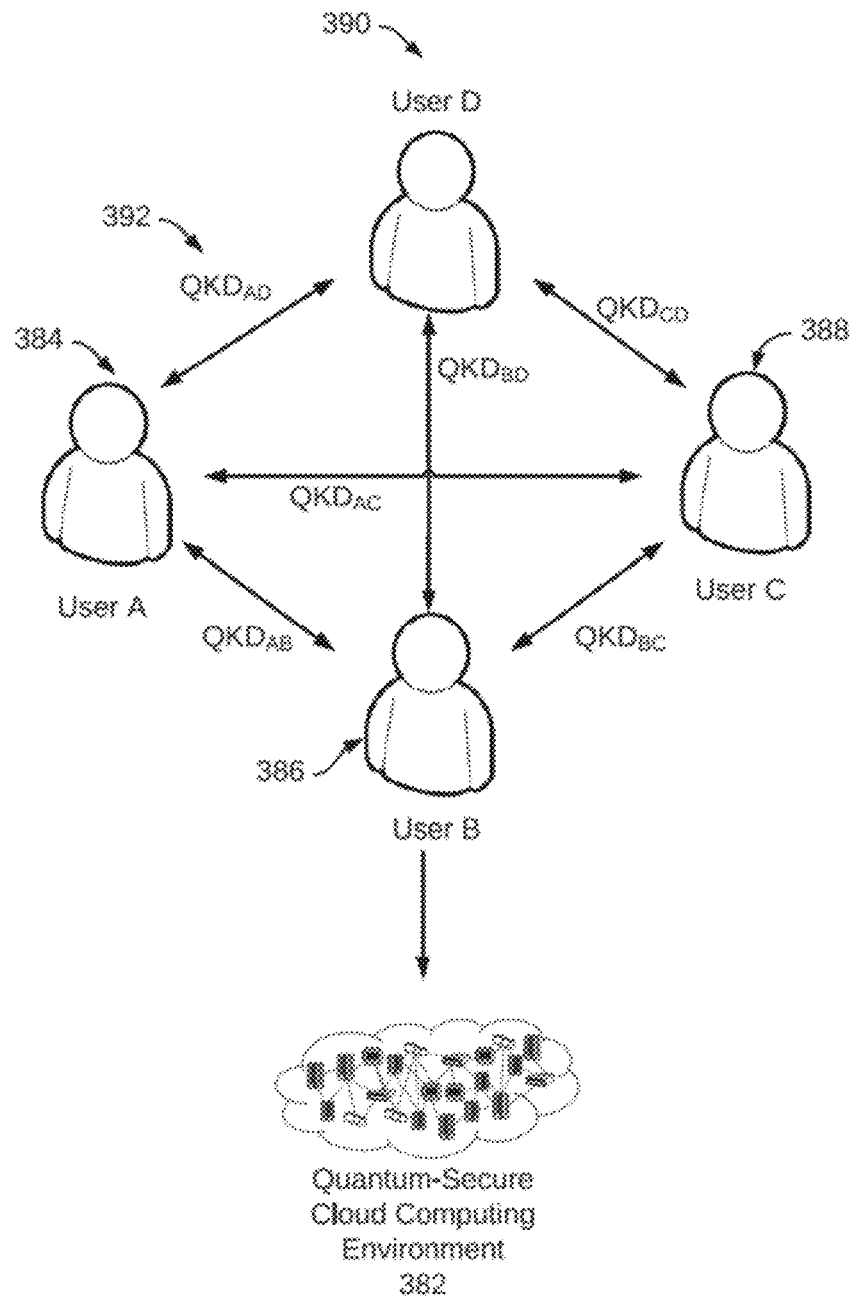
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

FIGS. 4A-4C illustrate a process of identifying a provider that is responsible for a software issue with a software system according to example embodiments. In these examples, a host process 430 such as a cloud orchestrator, or other control system, may embed NFTs with different software programs within a software system (e.g., file system 420). In addition, the host process may store vendor data of the different programs on the blockchain ledger. The vendor data may be mapped to the corresponding NFTs stored in the file system 420.

For example, in FIG. 4A, an embedding process 400A performed by the host process 430 may include generating a key pair that includes a private key 432 and a public key 434. This key pair may be unique to a particular instance of a software program 421 within the consumer's file system 420. Here, the unique private key 432 may be generated using a random number generator or some other desired manner such as a hash function applied to a known value, or the like. Likewise, the public key 434 can be generated based off of the private key 432 such as a predefined modification to the value of the private key 432 or a rehash of the private key 432 which generates the public key 434, or the like.

In this example, the private key 432 can be used to generate an NFT 436 which includes a unique token identifier. The unique token identifier 437 may be a random number or sequential number assigned to the NFT 436. The host process 430 may also maintain a mapping of the unique token identifier of the NFT 436 to the private key 432 therewithin (e.g., a memory of the host process 430, etc.) Furthermore, the public key 434 may be stored on a blockchain ledger 442 of a blockchain peer 440 via a smart contract 444 installed in the blockchain peer 440 and configured to read and write to the blockchain ledger 442. In addition to storing the public key 434, the smart contract 444 may record/commit the unique token identifier 437 of the NFT 436 along with provider data 438 registered by the provider of the software program 421 and the public key 434 to the blockchain leger 442. A similar process may be performed for the other software programs 422, 423, and 424 within the file system 420 to embed unique NFTs in each of the respective software programs using different key pairs.

A user may opt into the tracking performed by the host process 430 on the consumer side or on the provider side. For example, when the software is purchased and installed, a unique private NFT key is issued and embedded in the file system 420, a parallel key is generated and stored as a public key with the provider and on the blockchain ledger 442. In some embodiments there can be n number of instances of the public key 434 to support instances where the end user may duplicate files. The private key 432 is necessary and validated for each install to ensure proper access to the support provider. For example, the public key 434 may be used to validate the private key 432 via the smart contract 444. Here, the smart contract may perform a predefined function on the private key 432 or the public key 434 to arrive at a decision FIG. 4B illustrates a provider identification process 400B for identifying a provider that is responsible for an issue detected with the file system 420 according to various embodiments. In this example, an issue is detected within the file system 420. For example, an application or other software that relies on the file system 420 may encounter an error or other issue that causes problems within a runtime environment 412 of the host platform 410. Here, the host process 430 may receive an identifier of the issue along with an identifier of the file system 420, and search log files from a log data 414 for the cause of the issue. For example, the host process 430 may review entries within the log data 414. Each entry that is associated with a software program with an embedded NFT can include an identifier of the NFT therein. For example, the entry may include the token identifier assigned to the NFT.

In this example, the host process 430 identifies an entry of the issue within the log data 414 and the entry includes an NFT corresponding to the third software program 423 within the file system 420. Accordingly, the host process 430 may query the blockchain ledger 442 via the blockchain smart contract 444 with the unique token identifier of the NFT of the third software program 423 that is obtained from the log. For example, a token identifier 454 may be identified within the log and used to identify a corresponding record on the blockchain ledger 442 that includes the token identifier 454, a public key 452, and provider data 456 of the provider of the software program 423 with the embedded NFT. The host process 430 may validate the NFT by comparing the token identifier 454 of the NFT to the public key 452 (e.g., based on the mapping store in memory of the host process 430, etc.)

Furthermore, as shown in FIG. 4C, the host process 430 may output a notification 464 of a new ticket on a user interface 462 of a provider system 460. The notification 464 may identify the customer, the software program, and the issue. The host process 430 may also route a ticket to the provider system 460 for resolving the issue.

Figure 5:
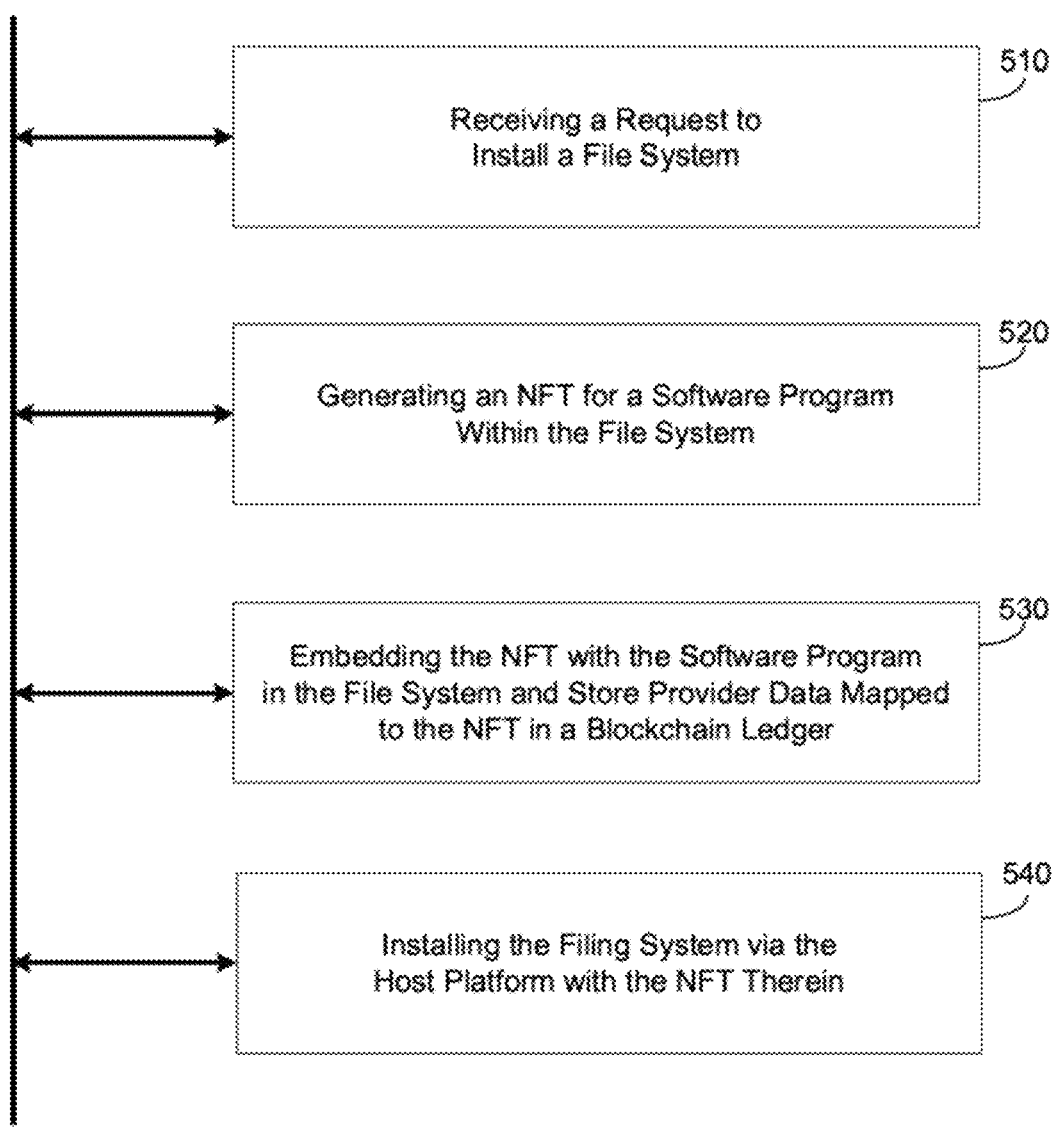
FIG. 5 is a diagram illustrating a method of recommending an API via a search engine according to example embodiments.

FIG. 5 illustrates a method 500 of recommending an API via a search engine according to example embodiments. For example, the method may be performed by a cloud platform, a web server, an on-premises server, a distributed system, or the like. Referring to FIG. 5, in 510, the method may include receiving a request to install a file system via a host platform, where the file system comprises a plurality of software programs of a plurality of providers, respectively. The request may come from a software application or the like which is being deployed on the host platform such as a container-based platform in which applications are stored in containers along with isolated file systems.

In 520, the method may include generating a non-fungible token (NFT) for a software program from among the plurality of software programs based on a private key. In 530, the method may include embedding the NFT with the software program within the file system and storing provider data of the software program mapped to the NFT via a blockchain ledger. In 540, the method may include installing the file system via the host platform with the NFT embedded therein.

In some embodiments, the method may further include generating a private key and a public key pair for the software program, and generating the NFT based on the private key and a unique identifier of the NFT. In some embodiments, the method may further include committing the public key to the blockchain ledger along with an identifier of the NFT embedded with the software program within the file system. In some embodiments, the method may further include receiving a notification of an issue with the file system installed on the host platform, and in response, identifying a provider that is responsible for the issue based on a log file of operations performed by the file system and the provider data stored on the blockchain ledger.

In some embodiments, the identifying may include identifying instances of the NFT within the log file, mapping the NFT to a provider of the software program based on the provider data stored on the blockchain ledger, and displaying a notification of the provider on one or more computing systems associated with the provider. In some embodiments, in response to receipt of the notification, the method may further include validating the NFT based on a public key that corresponds to the NFT which is stored on the blockchain ledger. In some embodiments, the method may further include generating a ticket for the issue and routing the ticket from the host platform to a computing system of the provider that is responsible for the issue. In some embodiments, the embedding may include embedding two different NFTs into two different software programs of the file system and storing provider data of the two different software programs mapped to the two different NFTs, respectively, via the blockchain ledger.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
   a storage configured to store a blockchain ledger; and a processor configured to:
receive a request to install a software system via a host platform, where the software system comprises a plurality of software programs of a plurality of providers, respectively,
generate a non-fungible token (NFT) for a software program from among the plurality of software programs based on a private key,
embed the NFT with the software program within the software system, and store provider data of the software program mapped to the NFT via the blockchain ledger, and
install the software system with the NFT embedded therein via a runtime environment of the host platform.

2. The apparatus of claim 1, wherein the processor is further configured to generate a pair based on the private key and a public key for the software program, and generate the NFT based on the private key and a unique identifier of the NFT.

3. The apparatus of claim 2, wherein the processor is further configured to commit the public key to the blockchain ledger with the unique identifier of the NFT embedded with the software program within the software system.

4. The apparatus of claim 1, wherein the processor is further configured to receive a notification of an issue with the software system installed on the host platform, and in response, identify a provider that is responsible for the issue based on a log file of operations performed by the software system and the provider data stored on the blockchain ledger.

5. The apparatus of claim 4, wherein the processor is further configured to identify instances of the NFT within the log file, map the NFT to a provider of the software program based on the provider data stored on the blockchain ledger, and display a notification of the provider on one or more computing systems associated with the provider.

6. The apparatus of claim 4, wherein, in response to receipt of the notification, the processor is further configured to validate the NFT based on a public key that corresponds to the NFT which is stored on the blockchain ledger.

7. The apparatus of claim 4, wherein the processor is further configured to generate a ticket for the issue and route the ticket from the host platform to a computing system of the provider that is responsible for the issue.

8. The apparatus of claim 1, wherein the processor is further configured to embed the NFT with the software program and another NFT with another software program of the software system and store provider data of the software programs via the blockchain ledger.

9. A method comprising:
receiving a request to install a software system via a host platform, where the software system comprises a plurality of software programs of a plurality of providers, respectively;
generating a non-fungible token (NFT) for a software program from among the plurality of software programs based on a private key;
embedding the NFT with the software program within the software system and storing provider data of the software program mapped to the NFT via a blockchain ledger; and
installing the software system via the host platform with the NFT embedded therein.

10. The method of claim 9, wherein the method further comprises generating a pair based on the private key and a public key for the software program, and generate the NFT based on the private key and a unique identifier of the NFT.

11. The method of claim 10, wherein the method further comprises committing the public key to the blockchain ledger with the unique identifier of the NFT embedded with the software program within the software system.

12. The method of claim 9, wherein the method further comprises receiving a notification of an issue with the software system installed on the host platform, and in response, identifying a provider that is responsible for the issue based on a log file of operations performed by the software system and the provider data stored on the blockchain ledger.

13. The method of claim 12, wherein the identifying comprises identifying instances of the NFT within the log file, mapping the NFT to a provider of the software program based on the provider data stored on the blockchain ledger, and displaying a notification of the provider on one or more computing systems associated with the provider.

14. The method of claim 12, wherein, in response to receipt of the notification, the method further comprises validating the NFT based on a public key that corresponds to the NFT which is stored on the blockchain ledger.

15. The method of claim 12, wherein the method further comprises generating a ticket for the issue and routing the ticket from the host platform to a computing system of the provider that is responsible for the issue.

16. The method of claim 9, wherein the embedding comprises embedding the NFT with the software program and another NFT with another software program of the software system and store provider data of the software programs via the blockchain ledger.

17. A computer-readable storage medium comprising instructions, that when read by a processor, cause the processor to perform a method comprising:
receiving a request to install a software system via a host platform, where the software system comprises a plurality of software programs of a plurality of providers, respectively;
generating a non-fungible token (NFT) for a software program from among the plurality of software programs based on a private key;
embedding the NFT with the software program within the software system and storing provider data of the software program mapped to the NFT via a blockchain ledger; and
installing the software system via the host platform with the NFT embedded therein.

18. The computer-readable storage medium of claim 17, wherein the method further comprises generating a pair based on the private key and a public key for the software program, and generate the NFT based on the private key and a unique identifier of the NFT.

19. The computer-readable storage medium of claim 18, wherein the method further comprises committing the public key to the blockchain ledger with the unique identifier of the NFT embedded with the software program within the software system.

20. The computer-readable storage medium of claim 17, wherein the method further comprises receiving a notification of an issue with the software system installed on the host platform, and in response, identifying a provider that is responsible for the issue based on a log file of operations performed by the software system and the provider data stored on the blockchain ledger.

* * * * *